United States Patent [19]

Hoffman et al.

[11] 3,875,288

[45] Apr. 1, 1975

[54] PRODUCTION OF SYNTHETIC SILICATE MINERALS

[75] Inventors: George W. Hoffman; H. Michael Blankenship; William T. Granquist, all of Houston, Tex.

[73] Assignee: NL Industries, Inc., New York, N.Y.

[22] Filed: Aug. 17, 1973

[21] Appl. No.: 389,118

[52] U.S. Cl.................. 423/118, 423/328, 423/329
[51] Int. Cl. ....................... C01f 7/00, C01b 33/00
[58] Field of Search..................... 423/118, 328, 329

[56] References Cited
UNITED STATES PATENTS

| | | | |
|---|---|---|---|
| 3,037,843 | 6/1962 | Mason | 423/118 |
| 3,252,757 | 5/1966 | Granquist | 423/328 |
| 3,338,672 | 8/1967 | Haden | 423/329 |
| 3,451,948 | 6/1969 | Scott | 423/328 |
| 3,515,682 | 6/1970 | Flank | 423/118 |

*Primary Examiner*—P. D. Rosenberg
*Attorney, Agent, or Firm*—Delmar H. Larsen; Roy F. House; Robert L. Lehman

[57] ABSTRACT

Mixed layer 2:1 phyllosilicates of the general type disclosed in Granquist U.S. Pat. No. 3,252,757 are produced starting with 1:1 clay minerals such as calcined kaolinite and calcined halloysite. The process provides economies of time as well as of material and equipment costs. A variant using a pelletized intermediate is especially advantageous.

11 Claims, No Drawings

PRODUCTION OF SYNTHETIC SILICATE MINERALS

This invention relates to the hydrothermal synthesis of 2:1 layer-type clay-like minerals of the general type taught in Granquist U.S. Pat. No. 3,252,757, and more particularly to improved procedures and a wider range of products within that category.

The aforesaid U.S. Pat. No. 3,252,757, the disclosure of which is hereby incorporated herein by reference, teaches a novel mixed-layer aluminosilicate mineral having manifold utility. The general procedure set forth therein comprises the formation of a reaction mixture including silica in reasonably pure form; alumina, again in relatively pure form; water; and various cations such as sodium, ammonium, and the like; and various anions, such as hydroxyl and fluoride. The reaction mixture is hermetically sealed, as by putting into a pressure vessel such as an autoclave, and is then heated say to 300° C., and maintained there for a number of hours until the mineral product has formed. The minerals thus synthesized have such diverse utility as hydrocarbon cracking catalysts, oil well drilling mud components, as bases for organophilic clay greases, and others.

The use of alumina produced by a chemical route as taught in the aforesaid Granquist patent represents a certain drain on world energy resources, albeit a small one, considering the metallurgy of bauxite. Further, the not inconsiderable duration of the high temperature processing step in this procedure not only consumes energy but raises production costs generally because of the lesser throughput possible with a given installation of inherently expensive equipment.

An object of the present invention is to provide a method of producing clay-like minerals of the type described with enhanced economy both in processing time and in raw material cost; and with a wider range of products.

Other objects of the invention will appear as the description thereof proceeds.

Generally speaking, and in accordance with illustrative embodiments of our invention, we produce a 2:1 layer-type clay-like mineral product having the empirical formula:

$$nSiO_2:Al_2O_3:mAB:xH_2O$$

where the layer lattices comprise silica, alumina, and B, and where $n$ is from 1.7 to 3.0, $m$ is from 0.2 to 0.6, A is one equivalent of an exchangeable cation chosen from the group consisting of ammonium, sodium, calcium, hydrogen, and mixtures thereof, and is external to the lattice, B is chosen from the group of anions which consists of $F^-$, $OH^-$, $½ O_2^{--}$, and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations  by first forming a reaction mixture by bringing together a 1:1 clay chosen from the group consisting of calcined kaolinite, calcined halloysite, acid-washed calcined kaolinite, acid-washed calcined halloysite, and mixtures thereof; a cation or mixture of cations chosen from A above, that is, ammonium, sodium, calcium, hydrogen, and mixtures thereof, in combination with an equivalent amount of an anion which may be hydroxyl or fluoride or mixtures thereof; and water.

The relative quantities of the several reaction mixture components are selected so as to give a molar ratio of silica to alumina, i.e., $SiO_2/Al_2O_3$, of between about 1.9 and 3.2; of fluoride ion to silica, i.e., $F^-/SiO_2$, of between about 0.02 and 0.3; and of ammonium ion to alumina, i.e., $NH_4^+/Al_2O_3$, of between about 0.1 and 2.0; and so as to give a pH of between about 4.5 and 11.5; and a solids/water weight ratio of between about 0.08 and about 0.6, i.e., from about 8 percent to about 60 percent solids.

The reaction mixture having been formed, it is then placed in a pressure vessel if indeed not already therein, which is then hermetically sealed and heated to a temperature within the range of about 275° C. to about 320° C., about 300° C. being generally preferred. This temperature is maintained until the 2:1 layer-type clay-like mineral product has formed. As will be seen from the examples which follow, typical times are of the order of three hours for batches of a kilogram or so. This may be compared with typical times set forth in the cited Granquist patent of about 1 to 2 days. We have found that in general as the size of the equipment and batch increases, the processing times decrease. Thus, in lots of the order of a ton or so, the Granquist product may often be made in as short a time as 4 or 5 hours; and for the same size batch the present invention permits a processing time as short as 1 hour.

The product having been formed as described, the vessel and contents are allowed to cool until the vessel may be safely opened, and the product is recovered. Any after treatment naturally depends upon the use to be made of the product. Simple draining of excess liquid with or without drying may be adequate. Or, the solids may be washed to any desired degree of freedom from excess salts, and may be base-exchanged with any desired cation or mixture of cations, and ultimately dried and ground if desired.

The product thus produced in accordance with the invention has the characteristics described for the product of Granquist U.S. Pat. No. 3,252,757, and discussed therein in coonsiderable detail. In particular, quite remarkably the product upon x-ray diffraction no longer exhibits any content of the starting 1:1 clay, but shows itself to be comprised of the randomly alternating mixture of interstratified mica-like and montmorillonite-like layers, both of which are 2:1 type phyllosilicates. This terminology is well understood by those skilled in the art. Reference may be made to the text by Ralph Grim: Clay Mineralogy, Ed. 2, New York 1968, and in particular chapters 3, on nomenclature, and 4, on structure, which are hereby incorporated herein by reference.

An especial advantage of the present invention is that it permits the production of the Granquist-type mineral product with a wider range of silica-to-alumina ratios than originally disclosed. Thus, good syntheses may be made at $SiO_2/Al_2O_3$ ratios of as small as 1.7. [It may be noted that the product in accordance with the invention generally has an $SiO_2/Al_2O_3$ ratio about 0.2 to 0.3 less than that of the reaction mixture.] When this is desired, a kaolinite of suitably low silica/alumina ratio may be selected, since there is some variation in the natural clay. Alternatively, most halloysites have lower ratios than most kaolinites.

In the event that higher ratios are desired, reactive silica is included in the reaction mixture. This may be polysilicic acid, produced for example in accordance with Hoffman U.S. Pat. No. 3,649,556; or a fumed silica, several of which are commercially available and which are characterized by extremely fine particle size, made for example by the silicon monoxide or the silicon tetrachloride route as described in the book by Ralph Iler: The Colloid Chemistry of Silica and Silicates, Ithaca 1955, on pages 168–9 and 172–3 thereof; or diatomite; or silica-rich tripoli. These are all described in Chapter VI of the book by Iler just cited, which is hereby incorporated herein by reference. The quantity of reactive silica admixed may be relatively small or great, but of course should not be so great as to exceed the silica/alumina ratio for the reaction mixture already specified herein.

Alternatively, the calcined kaolinite or calcined halloysite may be acid-washed, which selectively removes alumina by dissolution, leaving a usable structure with a higher silica/alumina ratio than the starting clay. Any strong acid may be used, such as sulfuric or hydrochloric, followed by water-washing to remove the residual acid and dissolved alumina. In general it is more practical and more economical to add reactive silica.

As already stated, the kaolinite or halloysite or the mixture of both is calcined before use in accordance with the invention. Calcination is carried out within the range 600° to 700° C., preferably about 650° C. The time is not critical, a half-hour or hour sufficing at the preferred temperature. Such calcining fundamentally changes the x-ray diffraction pattern of these clays. If the 1:1 clay is not calcined first, but used as mined, then the conversion to the unique 2:1 Granquist-type clay does not take place.

It may be noted that many clay firms will supply kaolinite already calcined to order, so that this step need not be carried out by the operator of the inventive procedure.

As will be evident from the examples to be given hereinbelow, the cation-anion combinations used in the reaction mixture may quite simply comprise ammonium bifluoride, $NH_4F.HF$, also written as $NH_4HF_2$; and ammonium hydroxide, $NH_4OH$, in preselected proportions to give the desired ratios. Calcium ion is conveniently added as calcium oxide, or, if included before calcining, as calcium carbonate. Sodium may be added as the hydroxide or the fluoride. In general, we prefer a fluoride/silica ratio of about 0.1; as this ratio diminishes, the reaction time tends to be prolonged.

A variation in procedure within the broad scope of the invention comprises the formation of pellets from all or most of the reaction mixture; or from all of the 1:1 clay and most of the other ingredients, with enough water to enable pellets to be readily formed using any commercial pelletizer, as is commonplace in the catalyst industry. A suitable size for the pellets is from about one-eighth to three-sixteenths inch in diameter, although this range may be exceeded. We have had excellent results at one-eighth inch. Kaolinites and halloysites from different sources tend to have different pelletizing characteristics, so that in some cases it may be desirable to include a binder in the mix fed to the pelletizer. A minor quantity of the mineral product made in accordance with the invention in a previous run serves admirably; 10 to 20 percent by weight of the calcined 1:1 clay may be used, for example. Alternatively, or additionally, some of the reactive silicas have binding properties and may be included for this purpose, especially polysilicic acid.

While the pellets so produced may be used forthwith, we prefer and find best to dry the pellets at about 105° C. to 110° C. and then calcine them at about 600° C. to 700° C., and preferably at about 650° C. Remarkably, even though in the preferred embodiment the pellets will have been made up with ammonium bifluoride and ammonium hydroxide as already mentioned, no additional fluoride ion need be incorporated in the final reaction mixture in spite of the high temperature of calcining. It appears that a semi-solid-state reaction occurs within the pellets during the drying and calcining, so that when the final conversion to the 2:1 phyllosilicate product is made in the autoclave, the conversion time is shortened even more so. The calcination of the pellets has the further advantage that they tend to retain their shape during the autoclaving, thus permitting ready access of the chemical solution surrounding them.

Some examples of the inventive procedure will now be given.

EXAMPLE 1

Five hundred grams of commercially calcined kaolinite were agitated with 1645 grams of water in a mixer, and 13.3 gm $NH_4HF_2$ and 62.3 gm $NH_4OH$ were added and well-mixed. The reaction mixture thus formed was placed in a one-gallon laboratory autoclave provided with a stirring mechanism and heated at 300° C. for 3 hours with agitation. The vessel was cooled to room temperature, the mineral product removed, sheared with a high-speed blender, dried at 105° C., and ground.

In this run, the $SiO_2/Al_2O_3$ ratio of the feed was 2.0, and that of the product was 1.93. The $NH_4^+/Al_2O_3$ ratio of the feed was 0.565, and the percent solids was 25. The $F^-/SiO_2$ ratio of the feed was 0.1.

EXAMPLE 2

To 565 gms water there were added 1286 gms of a solution of polysilicic acid containing 4.2 percent by weight of $SiO_2$. To this, 500 gm of calcined kaolinite were added, followed by 16.0 gm $NH_4HF_2$ and 59.6 gm $NH_4OH$. This was well mixed, and loaded into an autoclave as in Example 1 above and given the same treatment for the same time. The $SiO_2/Al_2O_3$ ratio of the feed was 2.4, and of the mineral product 2.20. The other ratios and percent solids were as given for Example 1.

EXAMPLE 3

This illustrates a second method of raising the $SiO_2/Al_2O_3$ ratio of the feed and thus of the product, Example 2 having shown the reactive silica technique. Six hundred gms of calcined kaolinite were mixed with 1400 gm of water and 144 gm of 66°Be. sulfuric acid, heated to about 88° C., and maintained at that temperature for 4 hours, with agitation. The slurry was then cooled to room temperature, filtered, and washed until free of sulfate ion. It was dried at 105° C. and ground to pass 200 mesh. It then had an SiO$_2$/Al$_2$O$_3$ ratio of 2.3.

The acid-treated kaolinite was then mixed with water, 225 gms of the clay and 2126 gms of water, to which was added 6.42 gm NH$_4$HF$_2$ and 24.2 gm NH$_4$OH. This was then mixed well and placed into a 1-gallon autoclave as in the previous examples and maintained at 300° C. for 3 hours with agitation. It was then cooled and recovered as in Example 1. The SiO$_2$/Al$_2$O$_3$ ratio of the feed was 2.3, that of the product not having been determined. The F$^-$/SiO$_2$ ratio of the feed was 0.1, the NH$_4^+$/Al$_2$O$_3$ ratio 0.550, the pH 9.2, and the solids 10 percent. The product had a pH of 8.7.

EXAMPLE 4

This illustrates the inventive procedure using a pelletized intermediate. Fifteen lbs. of calcined kaolinite and 0.6 lb. NH$_4$HF$_2$ were dry blended together, and then admixed with 1.28 lb. NH$_4$OH and a slurry of 8.0 lbs. water and 2.55 lbs. of the Granquist-type mineral product already at hand, and substantially like the product of Example 1. This mix was of extrudable consistency, and was formed into one-eighth inch pellets using a commercial extruder. The pellets were dried at 105° C. and then calcined at 650° C. for 2 hours.

Into a 1-gallon autoclave were placed 1071 gm of the calcined pellets together with 2000 gm water and 150 gm NH$_4$OH. The autoclave was brought to 300° C. and maintained there for 3 hours, no agitation being used. The vessel was cooled to room temperature, and the pellets, which had substantially retained their shape, were removed and dried at 105° C. The pellets were ground in a mill to a fine powder, to produce a finished product. A portion of this milled product was slurried with water at 20 percent solids and spray dried, to give a product in the form of microspheres especially adapted to rapid dispersal in various liquids.

The SiO$_2$/Al$_2$O$_3$ ratio of the feed was 2.0, and that of the product 1.80. The F$^-$/SiO$_2$ ratio of the feed was 0.15. The NH$_4^+$/Al$_2$O$_3$ ratio of the feed was 0.525.

All of the products of the foregoing examples showed the characteristics set forth for the Granquist-type mineral in U.S. Pat. No. 3,252,757. They had a high specific surface as determined by the Brunauer-Emmett-Teller method, and showed good hydrocarbon cracking ability when tested in a microcatalytic activity testing device, using a synthetic crude oil, in the procedure set forth in Example 10 of U.S. Pat. No. 3,252,757. Results follow:

Table 1

| Example No. | Bulk Density Lbs./Cu.Ft. | Percent Conversion Cracking Test | Surface Area M$^2$ per gm. |
|---|---|---|---|
| 1 | 20.3 | 70.2 | 118 |
| 2 | 18.3 | 62.9 | 85 |
| 3 | n.a. | 65.6 | 81 |
| 4 | 40.1 | 63.7 | 107 |

It will be understood that while we have explained the invention with the aid of specific examples, nevertheless considerable variation is possible in choice of raw materials, proportions, processing conditions, and the like, within the broad scope of the invention as set forth in the claims which follow.

Having described the invention, we claim:

1. The process of producing a 2:1 layer-type clay-like mineral product having the empirical formula:

$$nSiO_2:Al_2O_3:mAB:xH_2O$$

where the layer lattices comprise said silica, said alumina, and said B, and where
 $n$ is from 1.7 to 3.0,
 $m$ is from 0.2 to 0.6,
 A is one equivalent of an exchangeable cation chosen from the group consisting of ammonium, sodium, calcium, hydrogen, and mixtures thereof, and is external to the lattice,
 B is chosen from the group of anions which consists of F$^-$, OH$^-$, ½ O$_2^{--}$, and mixtures thereof, and is internal in the lattice, and
 $x$ is from 2.0 to 3.5 at 50 percent relative humidity, said mineral being characterized by a $d_{001}$ spacing at said humidity within the range which extends from a lower limit of about 12.0 A. when A is monovalent, to about 14.7 A. when A is divalent, and to a value intermediate between 12.0 A. and 14.7 A. when A includes both monovalent and divalent cations which comprises the steps of forming a reaction mixture by bringing together a 1:1 clay chosen from the group consisting of calcined kaolinite, calcined halloysite, acid-washed calcined kaolinite, acid-washed calcined halloysite, and mixtures thereof; a cation or mixture of cations chosen from the group consisting of said A, together with an equivalent amount of an anion chosen from the group consisting of hydroxyl and fluoride and mixtures thereof; and water; the relative quantities of said reaction mixture components being selected so as to give a molar ratio of SiO$_2$/Al$_2$O$_3$ of between about 1.9 and 3.2; of F$^-$/SiO$_2$ of between about 0.02 and 0.3; and of NH$_4^+$/Al$_2$O$_3$ of between about 0.1 and 2.0; and so as to give a pH of between about 4.5 and 11.5 and a solids/water weight ratio of between about 0.08 to about 0.6; and thereafter heating said reaction mixture under hermetically sealed conditions to a temperature within the range of about 275° C. to about 320° C. and maintaining said mixture within said range for a period of time long enough for said mineral product to form; and thereafter allowing said mineral product to cool and recovering said mineral product.

2. The process in accordance with claim 1 wherein said A consists of NH$_4^+$ or NH$_4^+$ and H$^+$ and said B consists of OH$^-$ and F$^-$.

3. The process in accordance with claim 1 wherein said reaction mixture additionally contains a reactive silica in an amount such that said SiO$_2$/Al$_2$O$_3$ ratio does not exceed the upper limit recited for said reaction mixture.

4. The process in accordance with claim 3 in which said reactive silica is chosen from the class consisting of polysilicic acid, fumed silica, diatomite, tripoli, and mixtures thereof.

5. The process in accordance with claim 1 wherein said 1:1 clay and at least portions each of said cations and anions and water are first formed into pellets, dried, and calcined at from about 600° to about 700° C., cooled, and thereafter admixed with the remainder of said anions and cations and water so as to complete the reaction mixture which is then heated under hermetically sealed conditions as recited in claim 1 so as to form said mineral product.

6. The process in accordance with claim 5 in which a minor proportion of said mineral product from a previous run is admixed with said clay and said portions of cations and anions and water so as to act as a binding aid for said pellets.

7. The process in accordance with claim 5 wherein said pellets additionally contain a reactive silica in an amount such that said $SiO_2/Al_2O_3$ ratio does not exceed the upper limit recited for said reaction mixture.

8. The process in accordance with claim 7 in which said reactive silica is chosen from the class consisting of polysilicic acid, fumed silica, diatomite, tripoli, and mixtures thereof.

9. The process in accordance with claim 4 in which said A consists of $NH_4^+$ or $NH_4^+$ and $H^+$ and said B consists of $OH^-$ and $F^-$.

10. The process in accordance with claim 5 wherein said A consists of $NH_4^+$ or $NH_4^+$ and $H^+$ and said B consists of $OH^-$ and $F^-$.

11. The process in accordance with claim 7 in which said A consists of $NH_4^+$ or $NH_4^+$ and $H^+$ and said B consists of $OH^-$ and $F^-$.

* * * * *